W. N. HARTSHORN.
DRYING, MIXING, AND KNEADING MACHINE.
APPLICATION FILED FEB. 10, 1920.

1,345,542.

Patented July 6, 1920.
2 SHEETS—SHEET 1.

Inventor
Willis N. Hartshorn
By Morsell & Keeney,
Attorneys.

W. N. HARTSHORN.
DRYING, MIXING, AND KNEADING MACHINE.
APPLICATION FILED FEB. 10, 1920.
1,345,542. Patented July 6, 1920.
2 SHEETS—SHEET 2.
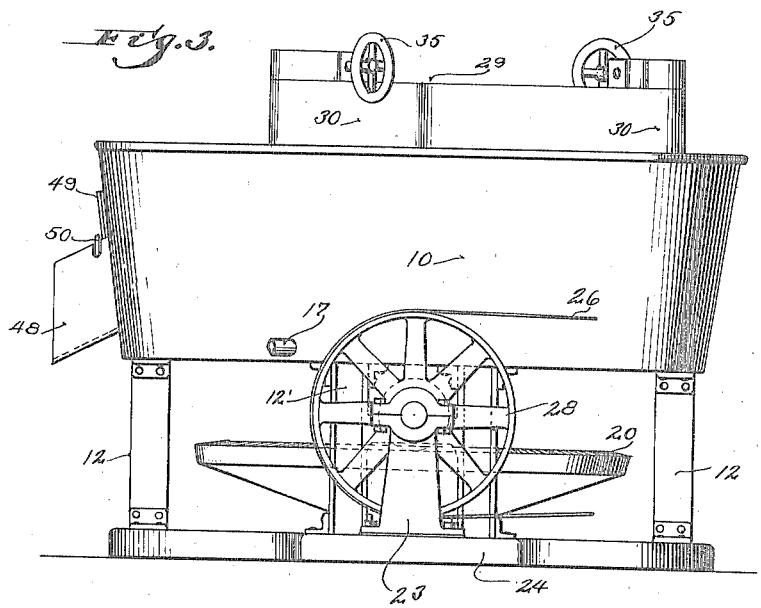
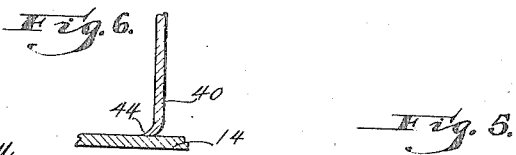
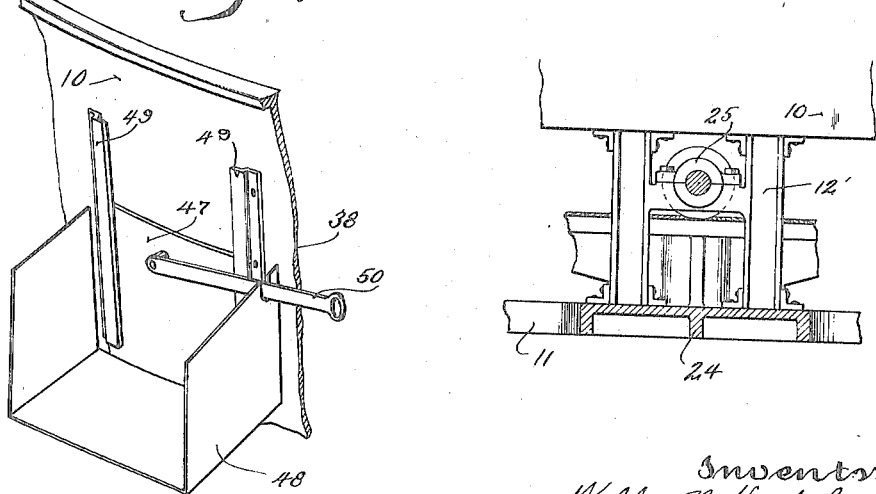
Inventor
Willis N. Hartshorn
By Morsell & Keeney
Attorneys

UNITED STATES PATENT OFFICE.

WILLIS N. HARTSHORN, OF RACINE, WISCONSIN.

DRYING, MIXING, AND KNEADING MACHINE.

1,345,542.     Specification of Letters Patent.     Patented July 6, 1920.

Application filed February 10, 1920. Serial No. 357,664.

*To all whom it may concern:*

Be it known that I, WILLIS N. HARTSHORN, a citizen of the United States, and resident of Racine, in the county of Racine and State of Wisconsin, have invented new and useful Improvements in Drying, Mixing, and Kneading Machines, of which the following is a description, reference being had to the accompanying drawings, which are a part of this specification.

The present invention relates to certain new and useful improvements in machines employed in working materials of various natures and has for one of its objects to provide a machine capable of use as a drying, mixing or kneading machine especially adapted for use with materials containing sufficient moisture to form a semi-fluid or plastic mass.

In drying materials in this condition, it is necessary to continually stir and knead the materials in such a manner as to give the greatest exposure alternately to the heated surfaces of the container and to the atmosphere and the kneading action is essential in order to maintain a homogeneous condition in the material during treatment and is also essential for the reducing of any lumps that may form during the working of the material.

Hence my invention has for another of its objects to provide a machine of the class described for kneading materials to be worked to alternately bring the same into contact with the heated surface of the container and to the atmosphere, and to further provide means for reducing any lumps that may form during the process.

In drying materials of a gummy nature, the mass reaches a point where it becomes very tenacious and in order to completely reduce the mass it is desirable to divide the same by a cutting or slicing operation before the mixing and kneading action can be continued to complete the working of the material.

My invention has for a further object to provide a machine of the class described provided with blade members operable to knead and mix the material being worked and capable of adjustment to provide knife members for slicing or cutting the material to assist in reducing the same to permit the efficient working of the material.

A still further object of this invention is to provide a machine of the class described adapted for use in treating materials that may be either heated or cooled or maintained at normal atmospheric temperature and which is provided with means for following the kneading or mashing member to effectively remove the material from the rim of the pan and the bottom and deflect the same into the path of the kneading member.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, and in which:

Fig. 3 is an end elevation of my complete machine.

Fig. 4 is a perspective view of a portion of the front wall of the container of my improved machine illustrating the discharge door through which the completed material is ejected.

Fig. 5 is a sectional view taken on the line 5—5 of Fig. 2, and

Fig. 6 is a fragmentary sectional view taken through the lower portion of one of the scraper blades on the line 6—6 of Fig. 1.

Figure 2:
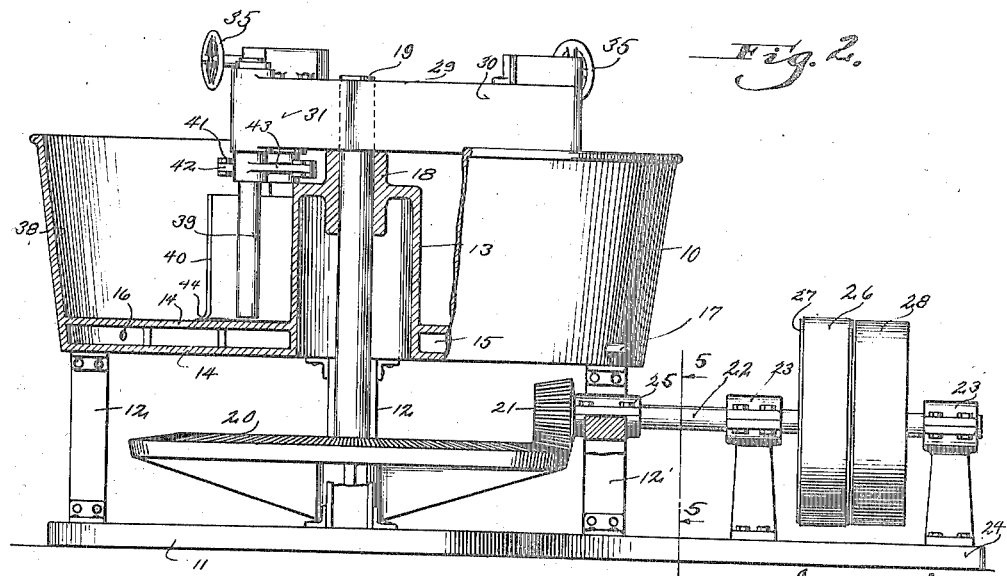
Fig. 2 is a view looking at the front of my improved machine, parts being broken away and in section to more clearly illustrate the details of construction.

Referring now more particularly to the accompanying drawings, my improved machine comprises a pan or container 10 supported above the base 11 by means of supporting legs 12 and having a central cylindrical projection 13 projected upwardly into the container 10 as best shown in Fig. 2. The container 10 is provided with a double bottom 14 forming a chamber 15 having an inlet 16 and an outlet 17 whereby any desired cooling or heating medium may be circulated therein according to the class of material being worked.

The central projection 13 has a central bearing member 18 formed therein in which is journaled the upper end of a vertical shaft 19 having its lower end journaled in a thrust bearing (not shown) carried by the base 11. The shaft 19 has secured thereto adjacent its lower end a large bevel drive gear 20 engaging the bevel pinion gear 21 secured to the inner end of a horizontal shaft 22. The shaft 22 is journaled in bearing standards 23 secured to an extension 24 of the base 11 and in a bearing 25 formed by the transverse portion of one of the supports 12' which is of H-shape. The shaft 22 is rotated by means of a drive belt 26 connected with a suitable source of power (not shown) and engaging either a drive pulley 27 fixed to the shaft 22 or an idler pulley 28 freely journaled on said shaft.

The upper end of the vertical shaft 19 has secured thereto a spider member 29 having two long arms 30 and a short arm 31, said arms carrying suitable blade members now about to be described.

Journaled in the outer end of each arm 30 is a vertical shaft 32 having a segmental gear member 33 secured to its upper end and meshing with a worm gear 34 carried by said arm and operable by a hand wheel 35, whereby said shafts may be given the desired partial rotation for the purpose to be later described. A mashing or kneading blade member 36 is medially secured to the lower portion of one of the shafts 32, and a scraping blade member 37 is medially secured to the other of said shafts 32, and said blade member 36 is adapted to have its trailing end 36' arranged to engage the rim 38 of the container 10 and the blade member 37 is arranged to have its leading edge 37' engage the rim 38.

Journaled in the outer end of the short arm 31 is a shaft member 39 having a scraping blade member 40 medially secured to the lower end thereof and having its leading end 40 engageable with the periphery of the projection 13. The scraper blade member 40 is simultaneously adjustable with the scraper blade 37 by means of a connecting rod 41 having one end pivotally connected to a crank arm 42 secured to the shaft 32 carrying the scraper blade member and its other end pivotally connected to a crank arm 43 fixed to the shaft 39. The blade member 36 is arranged to have its lower edge scrape the bottom of the container and the scraper blade members 37 and 40 have their lower edge curved forwardly in their direction of rotation as at 44 and scraping the bottom of the container for the purpose hereinafter described, see Figs. 1, 2 and 6.

Figure 1:
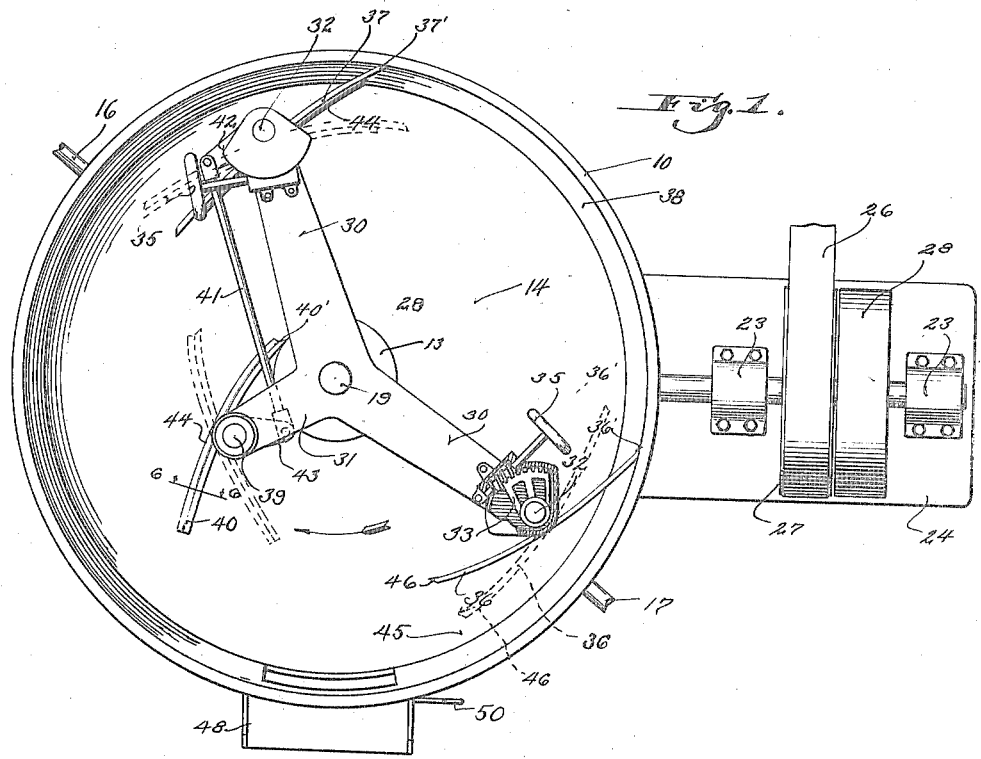
Figure 1 is a top plan view of a drying, mixing and kneading machine, embodying the various features of my invention, parts thereof being broken away and in section to more clearly illustrate structural details.

The spider 29 is rotated in the direction of the arrow in Fig. 1 by means of its connection with the drive belt 26 and the material to be worked is placed within the container, and the same is then mashed against the rim of the container by means of the blade member 36, when the blade member 37 scrapes the material from the bottom and the rim of the container and deflects the material toward the center of the container.

The blade member 40 then comes into play and removes the material which may adhere to the wall of the projection 13 and the central portion of the bottom of the container and directs the material directly into the path of the mouth 45 of the V-shaped opening formed by the blade member 36 and the rim 38 of the container, when the material is again mashed or kneaded against the rim and the bottom of the container.

This is continued until the material has been reduced to the desired state and to prevent the material from forming into a ball and resisting the reducing action of the blade member 36, the blade members are adjustable by means of the hand wheels 35 to positions substantially parallel with the rim of the container, see dotted lines Fig. 1, when the leading edge 46 of the blade member 36 and the leading edges 37' and 40' of the blade members 37 and 40 respectively engage the material and slice or cut the same into a number of parts. When the mass has been sufficiently reduced by such cutting or slicing action, the blade members are again adjusted to the position depicted in Fig. 1 and the operation of reducing and kneading the substance is continued as before described.

When the material has been sufficiently worked, it is discharged from the container by opening a door 47 which closes an opening in the rim of the container positioned at a discharge spout 48 and the blade member 36 together with the blade member 40 scrapes the finished material out of the container into the discharge spout. The door 47 is slidably mounted in guideways 49 and is controlled by an operating handle 50, and it will be understood that any desired form of discharge opening and controlling door may be employed.

The blade members may be readily adjusted to various positions as before described to adapt the same to the class of material being worked and to produce the desired finish to the materials, and in the working of plastic materials especially when the chamber 15 is being supplied with a heating medium, the material engaging the walls of the container becomes baked and the sharp edges of the scraping blade members continually remove such material from the surfaces of the container and the projection 13 and prevent the surface from becoming coated with such hardened material.

The curved portions 44 of the blade members 37 and 40 besides presenting a keen knife like edge to shave the bottom of the pan also provides the means for turning the mass during the mixing process.

From the foregoing description taken in connection with the accompanying drawings, it will be readily apparent to those skilled in the art to which an invention of this character appertains that I provide an improved drying, mixing and kneading machine capable of working materials of all classes, for reducing the same to powder, or mixing materials of various characters.

What I claim as my invention is:

1. A material working machine comprising a container, means for spreading and kneading the material being worked against the rim of the container, and means independent of the first mentioned means for removing the material from the container rim.

2. A material working machine comprising a container, means for spreading and kneading the material being worked against the rim of the container, means following said first mentioned means for removing the material from the container rim, and means for directing the material into the path of the first mentioned means.

3. A material working machine comprising a container, a blade member inclined rearwardly and outwardly with respect to its normal direction of rotation for mashing and kneading the material being worked between it and the rim of the container, and a second blade member inclined rearwardly and outwardly with respect to its normal direction of rotation for directing the material being worked in the path of the first mentioned blade member.

4. A material working machine comprising a container for receiving materials to be worked, a blade member having its trailing end arranged to mash and knead the material being worked between it and the rim of the container, a second blade member having its leading end arranged to remove the material from the container rim, and a third blade member arranged to deflect the material into the path of said first mentioned blade member.

5. A material working machine comprising a container for receiving materials to be worked, a blade member having its trailing end arranged to mash and knead the material being worked between it and the rim of the container, a second blade member having its leading end arranged to remove the material from the container rim, and a third blade member arranged to deflect the material into the path of said first mentioned blade member, said blade members being adjustable to provide means for slicing and cutting the materials being worked.

6. A material working machine comprising a container, a central projection within the container and of a height equal to the depth of the container, a blade member adapted to have its trailing end travel around and engage the rim of the container to mash and knead between it and the container wall the material being worked, a second blade member arranged to have its leading end travel around the rim of the container to the rear of said first mentioned blade member to remove the material from the container surfaces, and a third blade member having its leading edge travel around the peripheral wall of the central projection to remove the material adhering thereto and to direct the material being worked into the path of the first mentioned blade member.

7. A material working machine comprising a container, a central projection within the container and of a height equal to the depth of the container, a blade member for mashing and kneading the material being worked between it and the rim of the container, a scraper blade member following in the path of the first mentioned blade member for removing the material from the rim of the container, a second blade member following said first mentioned scraper blade member for removing the material from said central projection and deflecting the material being worked into the path of said first mentioned blade member, and means for adjusting said blade members to various positions with respect to the container rim.

8. A material working machine comprising a container, a central projection within the container, a blade member for mashing and kneading the material being worked between it and the rim of the container, a scraper blade member following in the path of the first mentioned blade member for removing the material from the rim of the container, a second blade member following said first mentioned scraper blade member for removing the material from said central projection and deflecting the material being worked into the path of said first mentioned blade member, means for adjusting said first mentioned blade member to various positions with respect to the container rim, and means for simultaneously adjusting said scraper blade members with respect to the rim of the container and the wall of said central projection.

9. A material working machine comprising a container, a blade member for mashing and kneading the material being worked between it and the container rim, and a scraper blade member for removing the material from the container rim and following said first mentioned blade member, said scraper blade member having its lower edge turned in the normal direction of rotation and engaging the bottom wall of the container.

10. A material working machine comprising a container, a blade member for spreading and kneading the material being worked against the rim of the container, a second blade member following the first mentioned blade member for removing the material from the container rim, a third blade member for directing the material into the path of the first mentioned blade member, and means for adjusting the relative positions of said blade members, said second and third blade members being adjusted simultaneously.

In testimony whereof I affix my signature.

WILLIS N. HARTSHORN.